United States Patent
Frayman et al.

(12) 
(10) Patent No.: US 6,687,816 B1
(45) Date of Patent: Feb. 3, 2004

(54) CONFIGURATION CACHING

(75) Inventors: Felix Frayman, Portland, OR (US); Allen E. Silky, Dublin, CA (US)

(73) Assignee: PeopleSoft, Inc., Pleasanton, CA (US)

( * ) Notice: Subject to any disclaimer, the term of this patent is extended or adjusted under 35 U.S.C. 154(b) by 0 days.

(21) Appl. No.: 09/542,128

(22) Filed: Apr. 4, 2000

(51) Int. Cl.⁷ .................................................. G06F 9/24
(52) U.S. Cl. .............................. 713/1; 713/1; 706/45; 707/500; 711/13
(58) Field of Search .............................. 713/1; 706/45; 707/500; 711/13

(56) References Cited

U.S. PATENT DOCUMENTS

| | | | | |
|---|---|---|---|---|
| 5,822,759 A | * | 10/1998 | Treynor | 711/134 |
| 5,987,473 A | * | 11/1999 | Jorgensen | 707/104 |
| 6,049,822 A | * | 4/2000 | Mittal | 709/217 |
| 6,115,547 A | * | 9/2000 | Ghatate et al. | 395/500 |
| 6,154,857 A | * | 11/2000 | Mann | 714/30 |
| 6,233,609 B1 | * | 5/2001 | Mittal | 709/219 |
| 6,404,445 B1 | * | 6/2002 | Galea et al. | 345/853 |
| 6,430,730 B1 | * | 8/2002 | Ghatate et al. | 716/4 |
| 2001/0037400 A1 | * | 11/2001 | Raz et al. | 709/232 |
| 2002/0010753 A1 | * | 1/2002 | Matsuoka et al. | 709/217 |
| 2002/0052807 A1 | * | 5/2002 | Han et al. | 705/27 |
| 2002/0078435 A1 | * | 6/2002 | Liu et al. | 717/121 |

* cited by examiner

*Primary Examiner*—Dennis M. Butler
*Assistant Examiner*—Nitin C. Patel
(74) *Attorney, Agent, or Firm*—Carr & Ferrell LLP

(57) ABSTRACT

User provided product configurations are identified and memorized along with their corresponding configuration information such as constraints and incompatibilities. The next time that configuration is provided by a user, the corresponding configuration information can be retrieved from memory so that a configuration engine will not need to be accessed. Retrieving the corresponding configuration information from memory as opposed to recomputing them with a configuration tool requires less time and avoids tying-up scarce configuration resources. Factors such as frequency and recentness can be considered in determining which configurations to memorize. Each time a particular configuration is provided, a counter associated with that configuration is incremented. Thus, within any given period of time, the number of times that particular configuration has been selected can be determined. Long-term frequency counts can track the most selected product configuration over a longer period of time. Updating the configuration cache with new configurations and their corresponding configuration information can be done selectively so as to optimize the use of the available configuration cache, as well as the response time of the configuration system based on actual user data.

16 Claims, 8 Drawing Sheets

Fig. 6

| | User Inputs | Configuration Engine Computations | UI Page Information |
|---|---|---|---|
| primary configuration information section 605 (601) | $a_1$ | a: $a_1$ $a_2$ $a_3$ ... $a_n$<br>b: $b_1$ $\cancel{b_2}$ $b_3$ ... $\cancel{b_n}$<br>c: $c_1$ $c_2$ $\cancel{c_3}$ ... $c_n$<br>z: $\cancel{z_1}$ $z_2$ $\cancel{z_3}$ ... $z_n$ | [diagram] |
| | $a_1 b_1$ | a: $a_1$ $a_2$ $a_3$ ... $a_n$<br>b: $b_1$ $b_2$ $b_3$ ... $b_n$<br>c: $c_1$ $\cancel{c_2}$ $\cancel{c_3}$ ... $c_n$<br>z: $\cancel{z_1}$ $z_2$ $\cancel{z_3}$ ... $\cancel{z_n}$ | [diagram] |
| | $a_1 b_2$ | a: $a_1$ $a_2$ $a_3$ ... $a_n$<br>b: $\cancel{b_1}$ $b_2$ $b_3$ ... $b_n$<br>c: $c_1$ $\cancel{c_2}$ $c_3$ ... $c_n$<br>z: $z_1$ $z_2$ $z_3$ ... $z_n$<br>Conflict Explanation | |
| | $a_1 b_3 c_4$ | a: $a_1$ $a_2$ $a_3$ ... $\cancel{a_n}$<br>b: $b_1$ $\cancel{b_2}$ $b_3$ ... $b_n$<br>c: $c_1$ $c_2$ $\cancel{c_3}$ ... $c_n$<br>z: $\cancel{z_1}$ $z_2$ $\cancel{z_3}$ ... $\cancel{z_n}$ | |
| | ⋮ | | |
| long-term frequency count section 610 | $a_1$ Total $N_1$ | \|39\| \|45\| \|22\| ... \|30\|<br>-1 -2 -3 -24 | |
| | $a_1 b_1$ Total $N_2$ | \|38\| \|20\| \|22\| ... ⌴<br>-1 -2 -3 | |
| | $a_1 b_2$ Total $N_3$ | \|47\| \|31\| \|15\| ... \|25\|<br>-1 -2 -3 -24 | |
| | $a_1 b_2 c_2$ Total $N_4$ | \|5\| \|18\| \|7\| ... \|38\|<br>-1 -2 -3 -24 | |
| | ⋮ | | |
| short-term frequency count section 615 | $a_1$ | \|42\| [UI Page Information] | |
| | $a_2$ | \|2\| [Configuration Engine Computations] | |
| | $a_3 b$ | \|1\| | |
| | $a_4 b$ | \|42\| [UI Page Information] | |
| | ⋮ | | |

CONFIGURATION CACHING

BACKGROUND OF THE INVENTION

1. Field of the Invention

This invention relates to product configuration and more specifically, to the caching of select configuration information during the product configuration process thereby improving the efficiency and response time of a configuration system.

2. Description of the Related Art

Many products offered by manufactures today can be manufactured in a multitude of different configurations. When a consumer desires to purchase such a configurable product, she is required to communicate the specific product configuration she wants to the supplier of that product. This interaction between the consumer and the supplier of the configurable product can be easily accomplished person to person. However, with the popularity of e-commerce and the willingness of consumers to purchase configurable products over the Internet, other forms of consumer-supplier interaction have developed.

One such form of interaction is where a consumer shops at the suppliers Internet web page (referred to as an "e-store"). As the consumer browses the e-store, products are visually and descriptively displayed thereby allowing the user to have a virtual shopping experience. Upon finding a product that the consumer is interested in purchasing, the finer details of configuring the product to the consumer's exact liking must be established. Depending on the product, the configuration may be fairly simple (e.g., selecting a color or size), to fairly complex (e.g., a computer system or automobile). Regardless of the configuration complexity, a configuration tool must be implemented to stand in the place of a human supplier.

A typical configuration tool presently being used is a software driven user-interface (UI) that displays all possible configurations to the consumer, and allows the consumer to select the various desired features of a configurable product. As the consumer selects each feature, a configuration engine coupled to the UI determines any incompatibilities or constraints arising from the selection of certain features. The UI then displays only the remaining features available for selection according to the configuration engine. For example, if a consumer shopping for a computer identifies the PENTIUM 586™ processor as the desired central processing unit (CPU) for the computer they wish to purchase, the available random access memory (RAM) feature of that computer may then be limited to 32 M-bytes or more. Thus, any RAM option having less than 32 M-bytes would be removed from the available features list by the configuration engine. The UI would reflect this by not offering the consumer the option to choose less than 32 M-bytes of RAM.

One problem that has arisen from this method is that configuration related computation may take a significant amount of computing time thereby tying up configuration resources (e.g., the configuration engine). The more complex the product, the more computation time that is required. As computation times increase with the complexity of a configurable product, configuration resources become scarce. As a result, consumers are required to wait thereby frustrating their virtual shopping experience. Ultimately, potential sales are lost. Moreover, the failed e-store transaction may send consumers away with a negative impression of virtual shopping. Such consumers may then refrain from using e-stores in the future, and communicate their negative experience to others thereby proliferating non-use of such e-stores.

One solution to this resources management problem is the reallocating of configuration resources in the event that they remain idle for a period of time. For example, if 60 seconds have gone by without any input from a first consumer, an assumption is made that the consumer is taking time to make a decision. Thus, while the first consumer is deciding, that particular configuration resource reallocates itself to a second consumer to allow processing of their product configuration. Once the first consumer makes their next selection, a configuration resource will be rededicated to complete that first consumer's product configuration.

Such a solution, however, introduces other problems. For instance, when a configuration system serves a large number of simultaneous users and it is not possible to have a continuous dedicated connection between the system and every user, the state of their configuration must somehow be maintained for the entire duration of their interactive session. Thus, a processing mechanism that reallocates users during their respective interactive sessions to different configuration engines has the problem of additional overhead. Specifically, additional processing is required to restore the state of the in-progress product configuration to the newly assigned configuration engine. This additional processing time places a drain on the configuration resources thereby limiting the ability of those resources to service other consumers.

What is needed then is a configuration technique that reduces the need for direct contact with configuration resources. The technique must provide efficient product configuration times by eliminating redundant processing cycles or computing time. The technique must further provide access to all configurable features of a given product, and must be able to define any constraints or incompatibilities that exist between the various combinations of configurable features.

BRIEF SUMMARY OF THE INVENTION

The present invention provides a system and method for selecting the features of a configurable product. More specifically, the present invention reduces the need for direct contact with configuration resources by memorizing various configurations that have occurred in the past. Thus, the present invention provides efficient product configuration times by eliminating redundant processing cycles or computing times. The present invention allows a user to access all configurable features of a given product, and defines any constraints or incompatibilities that exist between the various combinations of those configurable features.

The complete array of all possible configurations for a configurable product can be vast. Such a vast array of possible configurations cannot be fully processed and precomputed in a reasonable amount of time by configuration resources. However, a typical user of a configuration system generally does not explore all possible product configurations. Rather, a user may actually explore only a small sub-set or group of all possible product configurations. Moreover, when considering the actual configurations explored by all the users of a particular configuration system, it can be seen that only a relatively small number of configurations tend to be favored by a large set of those users. Thus, rather than attempt to memorize all of the possible configurations, one embodiment of the present invention memorizes the smaller number of configurations that are statistically favored based on the users' actual selected configurations. Weighted frequency counts can be used to determine these most favored configurations.

Once the group of actual selected configurations is identified and memorized, the corresponding constraints and incompatibilities that are associated with each of those configurations are also memorized. This memorized configuration information is available for later use thereby eliminating the need for redundant processing and computing efforts. More specifically, the next time that same configuration is provided by another user (or the same user for that matter), the corresponding constraints and incompatibilities can be retrieved from memory so that the configuration process can proceed to its next step. Retrieving the corresponding constraints and incompatibilities from memory as opposed to recomputing them with a configuration tool requires less time and avoids tying-up scarce configuration resources.

When product configuration parameters change for whatever reason (e.g., a vendor changes specification requirements of a microchip, or a discontinued item is replaced by a new improved item), the memory locations storing configuration information affected by that parameter change can be updated with current or more accurate configuration information by re-computing the configuration states (e.g., corresponding constraints and incompatibilities) based on the new configuration parameter. This updating and re-computation can take place during off-peak hours of the configuration system operation. Thus, the integrity of the counts for various configurable features can be maintained despite changes in the configuration parameters of the offered feature.

BRIEF DESCRIPTION OF THE DRAWINGS

FIG. 6 is a pictorial representation of a cache memory in accordance with one embodiment of the present invention.

DETAILED DESCRIPTION OF THE INVENTION

Figure 1A:
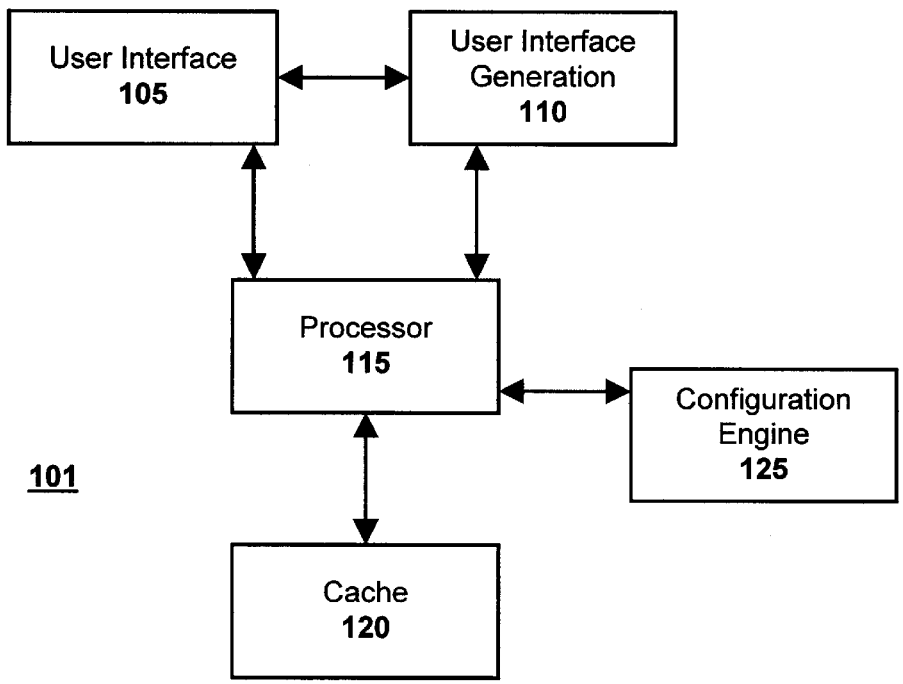
FIG. 1a is a lock diagram of one embodiment of a configuration system in accordance with the present invention.

FIG. 1a is a system block diagram of one embodiment of a configuration system in accordance with the present invention. Configuration system 101 is comprised of user interface 105, user interface generation unit 110, processor 115, cache 120 and configuration engine 125. UI 105 is coupled to UI generation unit 110. Both UI 105 and UI generation unit 110 are further coupled to processor 115. Processor 115 is coupled to both cache 120 and configuration engine 125. Each of the components that comprise configuration system 101 and their interaction will now be discussed in turn.

UI 105 provides a user-friendly graphical interface between a user and the configuration system. UI 105 allows the user to easily and effectively relate his desired product configuration to the configuration system without requiring any great deal of thought or understanding on the user's part as to how the configuration system actually operates. Graphical user interfaces are well known in the art and can be implemented in a number of ways to ease a user's experience in interacting with a complex system. UI generation unit 110 generates UI 105 based on various system parameters as well as input provided by the user. UI generation can be done in one action, or in several actions where portions of the overall UI page are generated independently of other portions. For example, non-configuration related information (e.g., user name) can be generated in one UI generation event, and configuration related information (e.g., constraints based on selected product features) can be generated in a second UI generation event. In such a case, the overall UI page presented to the user might be a combination of the first and second UI generation events (i.e., the UI portion representing the non-configuration related information is merged with the UI portion representing the configuration related information). User interface generation generally goes hand-in-hand with a user interface and is also well known in the art.

Processor 115 may comprise a microprocessor or central processing unit (CPU) and a memory (e.g., RAM) for storing and processing instructions. Processor 115 may also comprise other support functions such as a read only memory (ROM), I/O ports, and timers. Likewise, processor 115 can be a microcontroller unit. Those skilled in the art will recognize that processor 115 is configured to receive input, and is further configured to perform various processing instructions on that received input. Processor 115 can form a query based on input received and communicate that query to another system component (e.g., configuration engine). In short, processor 115 can perform all functions that a conventional processing unit can perform, such as fetching data, sending data, requesting data, storing data, storing instructions, executing instructions, and controlling the functionality of a system or any one of the components comprising that system.

Instructions stored and executed by processor 115 can be implemented in software, hardware, firmware or any combination thereof. For example, such instructions may perform a comparison of two pieces of data using a comparator. Alternatively, a software function that examines individual bits of a data byte, word, etc may be implemented to perform the comparison. The instructions may be resident in a ROM-type memory (e.g., EPROM) accessible by processor 115, or may be resident in a data file accessible by processor 115. Those skilled in the art will appreciate that processor 115 can execute a number of instructions in accordance with the present invention. Looping, performing calculations, comparing data, detecting data, moving data, sorting data and updating data are all examples of what the instructions of processor 115 can accomplish.

Configuration engine 125 can be any one of a number of available configuration engines. One example of a configuration engine is described in U.S. Pat. No. 5,745,765 to Paseman, which in herein incorporated by reference in its entirety. Typically, as a customer selects various product features of a configurable product, a configuration engine 125 determines constraints imposed on that product, and updates the available product features library based on those constraints. As such, configuration engine 125 can prevent invalid configurations, and can be used to guide the customer to a successful final product configuration. Although processor 115 is shown in FIG. 1a as separate from configuration engine 125, those skilled in the art will appreciate that configuration engine 125 and processor 115 can be implemented in a single unit that has equivalent functionality of the two separate units.

Cache 120 can be any type of memory that can be written to, or read from. In general, cache memory is a dedicated, high-speed memory that is readily accessible by a processing unit. One benefit of such as memory is that exchanges of data between the memory and processing unit are very fast and the overall efficiency of the system in which the cache memory is employed is significantly increased. Cache 120 can be internal to processor 115. Alternatively, cache 120 can be external to processor 115. Cache 120 can be comprised of a RAM style memory chip (e.g., SRAM chip), or can be comprised of a series of RAM style memory chips residing on a motherboard or on a single in-line memory module (SIMM). Alternatively, cache 120 can be implemented as a data file or data structure that is accessible by processor 115. Those skilled in the art will recognize that cache 120 can be implemented in a number of ways equivalent to that described above and in accordance with the present invention.

UI generation unit 110 receives input from UI 105 and communicates that input to processor 115. Processor 115 can also receive input directly from UI 105. The input received generally requires the configuration system to provide resulting information back to the user. This resulting information represents the systems reaction to the input provided by the user. If the input received requires information that is presently stored in cache 120, then there is no need to access configuration engine 125. Conversely, if the input received requires information that is not presently stored in cache 120, then configuration engine 125 can be accessed to generate the required information. Once the required information is generated by configuration engine 125, processor 115 can store that information in cache 120 so that it will be available the next time a user provides the same input. After processor 115 receives the required information from cache 120 or configuration engine 125 that information is provided to UI generation unit 110. There, the information is converted to a user friendly graphical representation, and is then communicated to the user through UI 105. Alternatively, if the information received from cache 120 is a UI page (or a partial UI page), then that information can be provided directly to UI 105 by processor 115.

Cache 120 can receive data from a number of different sources. For example, cache 120 can receive input from UI 105 via processor 115. Thus, when the user selects features of a configurable product thereby defining a product state, that product state can be stored in cache 120. This product state is an accumulation of single inputs (e.g., selected product features) provided by the user. The product state is generally referred to as the user input. Thus, a "single user input" is a single feature selected by the user. However, a "user input" is a collection of single user inputs, whether that collection be representative of one feature or a plurality of features.

Also, cache 120 can receive input from configuration engine 125 via processor 115. For example, when a user input is provided that requires a computation by the configuration engine, the resulting computations can be stored in cache 120 along with the corresponding input that made those computations necessary. Additionally, cache 120 can receive user input from UI generation unit 110 via processor 115. In this case, the resulting user friendly graphical representation (also referred to as a "UI page") embodying the required configuration information is stored in cache 120 along with the corresponding user input that triggered the generation of that UI page. Those skilled in the art will appreciate that many forms of data such as raw, intermediate or processed data can be cached in accordance with the present invention. The above exemplar descriptions are not intended to limit the types of data or information that can be cached.

Figure 1B:
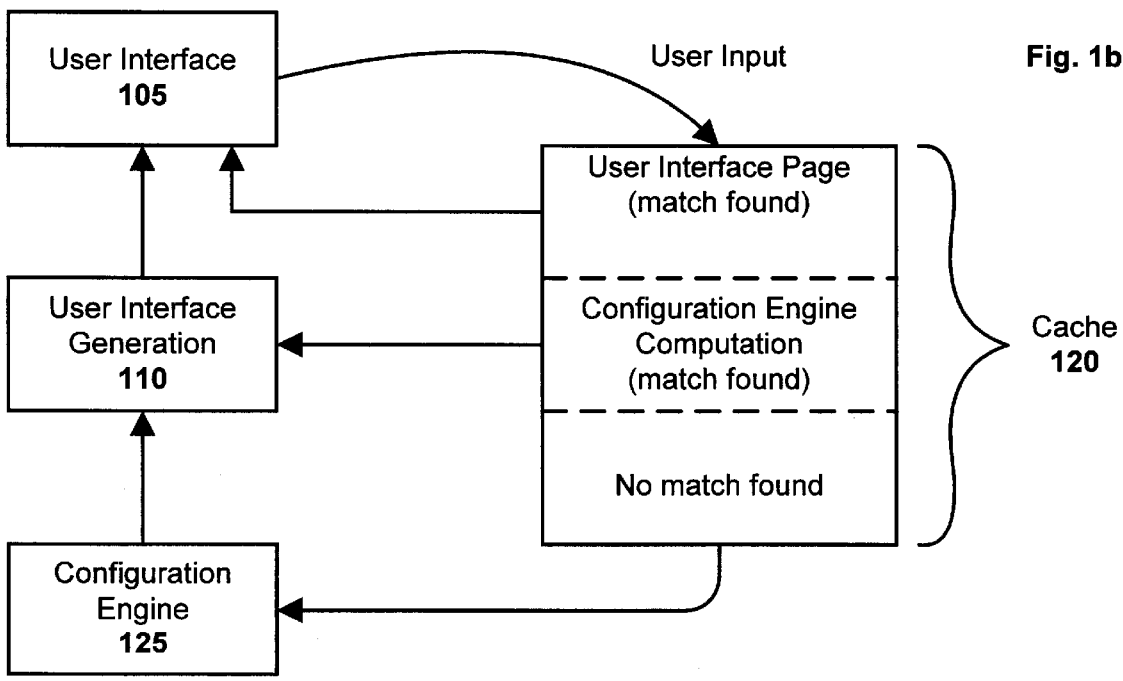
FIG. 1b is on embodiment of a cache use flow diagram in accordance with the present invention.

FIG. 1b is one embodiment of a cache use flow diagram in accordance with the present invention. As explained above, cache 120 can store various types of information. If the information necessitated by the user input from UI 105 is not found in cache 120, then configuration engine 125 is accessed. However, if the user input has a match in cache 120, then the information associated with that cached user input can be retrieved and provided where necessary. As earlier explained, "user input" refers to the product state at any one point in time during the configuration process. As such, the term "user input" can represent a single user input or selection, or it can represent a plurality of user inputs or selections depending on the stage of the configuration process.

To illustrate how the user input is related to the cache use flow, consider the following example that shows the impact that a first user's configuration process can have on a second user's configuration process. This example is based on a configurable product having seven features: A, C, D, E, G, H and Z. Assume for the sake of this example that the order in which a user selects these features is irrelevant. Further assume that the configuration system 101 (FIG. 1a) is set to cache the user input after each single user input is received (e.g., after each feature is selected), and that the cache 120 was empty before a first configuration process was started. As the user selects the various features of the configurable product, the resulting user input evolves. This evolution can be better visualized in Table 1 below:

TABLE 1

| A First User's Configuration | |
|---|---|
| Single User Input (Selected Feature) | Resulting User Input |
| A | A |
| E | A, E |
| C | A, C, E |
| H | A, C, E, H |
| G | A, C, E, G, H |
| D | A, C, D, E, G, H |
| Z | A, C, D, E, G, H, Z |

The resulting user input is an accumulation of single user inputs (selected features) provided up to that point in the configuration process. In this example, the first feature selected by the first user was "A." This selection resulted in a user input of "A," and is an example of a "single user input" representing the "user input" as described above. The second feature selected by the first user was "E." This selection is combined with the first selection thereby resulting in a user input of "A, E." The third feature selected by the first user was "C." This selection is combined with the first and second selections thereby resulting in a user input of "A, C, E." The fourth feature selected by the first user was "H." This selection is combined with the first, second and third selections thereby resulting in a user input of "A, C, E, H." This example configuration process continues with fifth, sixth and seventh feature selections of "G," "D" and "Z" respectively. The resulting user inputs of these selections are "A, C, E, G, H," "A, C, D, E, G, H" and "A, C, D, E, G, H, Z," respectively.

In this example, the cache 120 was empty before the first configuration process begins. Thus, there will be no match for any of the resulting user inputs provided by the first user. Accordingly, the configuration engine 125 will be accessed to produce a number of configuration engine computations associated with each user input. These configuration engine computations define the constraints associated with each user input. The cache 120 can be updated with each of the seven resulting user inputs as well as the configuration engine computations associated with those seven user inputs. Likewise, cache 120 can be updated with a UI page (partial or complete) that embodies the configuration engine computations associated with those seven user inputs. Caching UI page information that has the configuration engine computations embedded within the page reduces the need to access the configuration engine 125 and the UI generation unit 110.

To further illustrate cache use flow, assume now that a second configuration process is initiated by a second user for the same configurable product having the seven features. The second user performing this second configuration process selects the features as shown in the Table 2 below:

TABLE 2

A Second User's Configuration

| Single User Input (Selected Feature) | Resulting User Input |
|---|---|
| C | C |
| A | A, C |
| E | A, C, E |
| G | A, C, E, G |
| H | A, C, E, G, H |
| Z | A, C, E, G, H, Z |
| D | A, C, D, E, G, H, Z |

As can be seen, the second user selected first and second features of "A" and "C," respectively thereby defining respective user inputs of "C" and "A, C." Since neither of these user inputs was previously stored in the cache 120 (i.e., there is no match for these user inputs in this example), the configuration engine 125 is accessed to generate the corresponding configuration engine computations. However, the second user's third selection was feature "E" resulting in a user input of "A, C, E." This user input was also provided by the first user as shown in Table 1. Thus, there is a match and the configuration engine 125 does not need to be accessed to produce the configuration engine computations associated with that user input. Rather, the configuration engine computations associated with that user input are, in one embodiment of the present invention, already produced and stored in the cache 120. These configuration engine computations can be provided to the UI generation unit 110 so that a UI page (or portion thereof) embodying the associated configuration engine computations can be generated and provided to UI 105. In an alternative embodiment, a UI page (or portion thereof) that embodies the associated configuration engine computations is already generated and stored in the cache 120. This UI page can be provided to the UI 105.

Continuing on with the second user's configuration, the fourth selection was feature "G" resulting in a user input of "A, C, E, G." This user input was not provided by the first user, and there is no match in the cache 120. Thus, the configuration engine 125 needs to be accessed to produce the configuration engine computations associated with that user input. The fifth selection of the second user was feature "H" resulting in a user input of "A, C, E, G, H." This user input was also selected by the first user as shown in Table 1. Thus, there is a match and the configuration engine 125 does not need to be accessed to produce the configuration engine computations associated with that user input as explained with respect to the user input of "A, C, E."

The sixth selection of the second user was feature "Z" resulting in a user input of "A, C, E, G, H, Z." The first user did not select this user input, and there is no match in the cache 120. Thus, the user input of "A, C, E, G, H, Z," along with its associated configuration engine computations or UI page information, can be stored in the cache 120. However, the seventh selection of the second user was feature "D" resulting in a user input of "A, C, D, E, G, H, Z." This user input was also selected by the first user as shown in Table 1. Thus, there is a match and the configuration engine 125 does not need to be accessed to produce the configuration engine computations associated with that user input. The associated configuration engine computations or UI page information can be retrieved from the cache 120 and provided to the UI generation unit 110 or the UI 105, respectively.

In the preceding example, it was assumed that the order in which a user selected the seven features of the configurable product was irrelevant. Alternatively, if certain selections are order dependent, then their order relative to each other must be maintained by the resulting user input. For instance, assume in the example provided above that the order of the G and H features is important. In this case, the user inputs of "A, E, C, H, G" and "A, E, C, H, G, D, Z" selected by the first user would not provide a match to the user inputs "C, A, E, G, H" and "C, A, E, G, H, Z, D" of the second user (note the listed order of the single inputs comprising each user input was changed to reflect the actual selection order). Thus, configuration engine would be accessed for these user inputs. However, the user input of "A, E, C" provided by the first user would still be a match for the user input "C, A, E" provided by the second user because the order of the features comprising these inputs is irrelevant.

Figure 2:
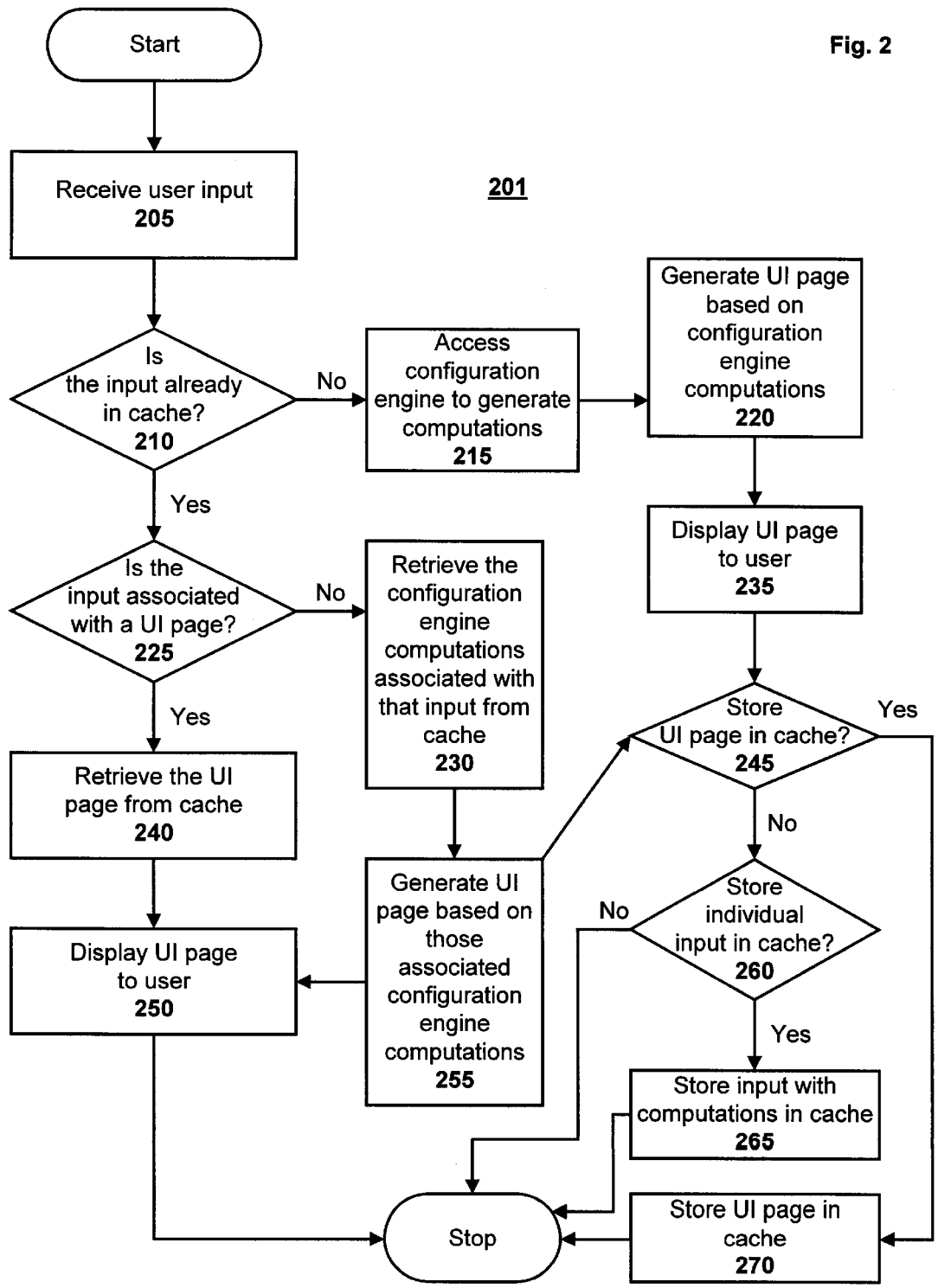
FIG. 2 illustrates a method, in accordance with one embodiment of the present invention, for providing configuration results to a user in response to the user selecting one or more features of a configurable product.

FIG. 2 illustrates a method, in accordance with one embodiment of the present invention, for providing configuration results to a user in response to the user selecting one or more features of a configurable product. This exemplar method can be performed in the exemplar configuration system shown in FIG. 1a. Thus, as the method is discussed, reference to the relevant system components shown in FIG. 1a will also be made. However, one skilled in the art will appreciate that the steps of the method shown in FIG. 2 can also be performed in a system that is comprised of components not shown in FIG. 1a. As such, the illustrated method of FIG. 2 is not intended to be limited by the system of FIG. 1a, and reference to FIG. 1a is offered for discussion purposes only.

Process 201 includes UI 105 receiving 205 a user input. As previously explained, the user input is cumulative and defines a collection of single user inputs or selected features. That user input can then be communicated to both UI generation unit 110 and processor 115. Processor 115 then makes a determination 210 as to whether that user input is already in cache 120. If the user input is already in cache 120, a further determination 225 as to whether the user input is associated with UI page information is made by processor 115 (recall that a UI page graphically represents configuration engine computations also associated with that user input). If yes, then process 201 continues by retrieving 240 that UI page from cache 120, and displaying 250 that UI page to the user via UI 105.

If the user input is not associated with a UI page, then the input may be presumed to be associated with configuration engine computations only. In such a case, process 201 continues by retrieving 230 those configuration engine computations from cache 120, and by generating 255 a UI page with UI generation unit 110 based on those associated configuration engine computations. Once the UI page is generated, process 201 continues with displaying 250 that UI page to the user via UI 105. Additionally, once step 255 is performed, a determination 245 as to whether the UI page should be cached can be made by processor 115. The results to this determination 245 are discussed in turn after step 235 is discussed.

If determination 210 indicates that the user input is not already in cache 120, then process 201 continues by accessing 215 the configuration engine 125 to generate the configuration engine computations that correspond to the user input. Once those configuration engine computations are generated, process 201 proceeds with generating 220 a UI page with UI generation unit 110. As earlier explained, the configuration engine computations are graphically represented in the generated UI page. Displaying 235 the UI page to the user is accomplished via UI 105. Additionally, a determination 245 as to whether the UI page should be cached is made by processor 115. If the determination is affirmative, process 201 continues by storing 270 the UI page in cache 120. If it is determined that the UI page should not be cached, a further determination 260 as to whether the configuration engine computations should be cached is made by processor 115. If the determination is affirmative, process 201 includes storing 265 the configuration engine computations in cache 120. If it is determined that the configuration engine computations are not to be stored, then process 201 for that particular user input is complete. The next user input can then be processed per process 201.

FIG. 6 is a pictorial representation of a cache memory in accordance with one embodiment of the present invention. Cache memory 601 can be comprised of three sections: (1) a primary configuration information section 605, (2) a long-term frequency count section 610, and (3) a short-term frequency count section 615. These three sections can represent one contiguous block of memory. Such a block can be partitioned or simply divided according to an addressing scheme into the individual sections. For example, the three sections can be implemented on a RAM disk, or on a number of RAM chips (e.g., DRAM or SRAM) having consecutive addresses from one chip to the next. Alternatively, each section can be a separate block of memory that is not contiguous with any of the other memory sections. For example, each section can be comprised of a number of non-consecutively addressed memory chips, or individually accessible disk drives.

By providing subsections of memory within the allocated cache memory space, the various types of configuration data generated by the configuration system can be staged and manipulated to optimize the performance of the system. For example, caching every user input and its associated configuration information may result in a significant amount of memory space being used as well as an increased processing time. However, integrating the user input and associated configuration information into a primary configuration information memory selectively through a tiered staging plan results in a more efficient use of memory resources and reduces processing time.

Referring to the example shown in FIG. 6, short-term frequency count (STFC) section 615 represents an initial stage of cache memory 601. Configuration information from this section is graduated to long-term frequency count (LTFC) section 610, which is the secondary stage of cache memory 601. Configuration information from this secondary stage is graduated to primary configuration information section 605 provided certain criteria are met. Examples of each of these tiered sections or stages as provided by FIG. 6 will now be discussed in more detail.

In the example of FIG. 6, STFC section 615 includes user input $a_1$ and its associated count (i.e., 42), user input $a_2$ and its associated count (i.e., 2), user input $a_3b$ and its associated count (i.e., 1), and user input $a_4b$ and its associated count (i.e., 42). These entries in STFC section 615 (also referred to as an STFC table) represent all the inputs made by users during a given period of time (e.g. ½ hour or 1½ hours). This period of time is referred to as a short-term time period. In one embodiment, the various user inputs and their associated counts are the only configuration information stored in STFC section 615. Alternatively, configuration engine computations or UI page information (whether it be a partial UI page or a complete UI page) associated with any one of the user inputs can also be stored in STFC section 615 depending on the desired system performance. Thus, the amount of configuration information stored in STFC section 615 can be varied.

The LTFC section 610 (also referred to as an LTFC table) includes several user inputs and their associated counts. For example, user input $a_1$ and all its associated counts for the last 24 short-term time periods are shown in the LTFC section (i.e., 39 for the most recent short-term time period; 45 for the second most recent short-term time period; 22 for the third most recent short-term time period; and proceeding all the way out to the twenty-fourth most recent short-term time period count of 30). Each of the counts is associated with a position based on the recentness of the count. Each position can be associated with a weight factor. For example, the most recent position is referred to as weighted spot number one and might have a weight factor of one; the second most recent position (weighted spot number 2) might have a weight factor of 0.9; and the weight factor at weighted spot number 24 might be 0.1.

The total count (also referred to as the long-term frequency count) for a user input can be calculated by mathematically managing each count and its associated weight factor. For instance, the total count for the user input $a_1$, which is indicated as $N_1$, might be calculated by summing the products resulting from multiplying each count by its associated weight factor (e.g., $[(39*1)+(45*0.9)+(22*0.85)\ldots+(30*0.1)]=N_1$). How the weight factor is determined depends on the particular application, and there are many ways to implement such a weight factor as discussed above. Thus, each user input in LTFC section 610 has a total or long-term frequency count associated with it.

The primary configuration information section 605 stores a number of user inputs and their associated configuration information. For example, user input $a_1$ has both configuration engine computations and UI page information stored with it in primary configuration information section 605. The configuration engine computations reflect the selectable feature (e.g., a, b, c or z) and the possible choices corresponding to that feature (e.g., $a_1$, $a_2$, $a_3$, or $a_n$). Choices that have been conflicted out (based on user selected features) are shown with a hash mark drawn through them. Conflicts imposed by a selected feature can be propagated through out the library of selectable features as is conventionally done.

With regards to the stored UI page information, it may either be a partial UI page or a complete UI page. Having both configuration engine computations and UI page information stored may be desirable where people of many languages access the configuration system. A language flag associated with the UI page can be used to identify the language of that UI page. In one embodiment of the present invention, processor 115 can compare that language flag to a corresponding language flag associated with the non-configuration related portion of the UI page. This corresponding language flag can be defined, for example, during the initialization of the configuration system (e.g., when UI 105 preferences are customized to the user's particular application). If processor 115 determines that the flags are equal, then the stored UI page is in a language that matches the language of the UI page being observed by the user. If the flags are different, then the language of the stored UI page is different than the language of the UI page being observed by the user.

For instance, a stored French UI page will probably not be acceptable to a Spanish user. In such a case, the language flag associated with the Spanish user's UI page will not match the language flag associated with the stored French UI page. As such, the Spanish user will not have access to the French UI page, but will still have access to the cached configuration engine computations that can be used to generate a corresponding Spanish UI page. However, a French user will be able to benefit from having the French UI page already generated and available in primary configuration information section 605 (i.e., the language flag associated with the French user's UI page will match the language flag associated with the stored French UI page.

Some configuration applications involve multiple UI pages. For example, a complex product having several hundred selectable features and various subassemblies may need to be configured on several different UI pages. In such a configuration, the configuration engine computations that affect any one UI page can be accessed independently of other related configuration engine computations not affecting that UI page. In one embodiment, this selective accessing of configuration engine computations can be accomplished by directing processor 115 to provide a selection key or flag along with the user input to the cache 120. This selection key can be stored in cache 120, and corresponds to specific features associated with a particular UI page. This key would signal to cache 115 that only those configuration computations associated with features selected from that particular UI page are of interest. The configuration engine computations related to other features not associated with that particular UI page would not be read from cache 115.

For example, assume user input $a_1b_1$ of FIG. 6 affects features a and b directly, and features c and z indirectly through propagated constraints. User input $a_1b_1$ has both configuration engine computations and two UI pages stored with it in the primary configuration information section 605. The UI page on the left can be associated with the features of "a" and "b." These features might, for instance, correspond to the body style of the product being configured (e.g., an automobile). The UI page on the right, however, can be associated with the features of "c" and "z." These features might, for instance, correspond to the stereo system of the product being configured. Assume the body style feature choices "$a_1$" and "$b_1$" require a four-speaker stereo system as opposed to a six-speaker stereo system. This constraint is reflected by the hash marks through features $c_2$ and $z_n$ (assuming these feature choices correspond to the six-speaker stereo system) in the configuration engine computations associated with user input $a_1b_1$. Thus, if a user is viewing the UI page associated with configuring the body style, and the user input $a_1b_1$ is provided to the primary configuration information section 605 along with a selection key corresponding to body style features, then only the configuration computations associated with features a and b would be read from the primary configuration information section 605. Alternatively, only the stored UI page associated with features a and b (e.g., the UI page on the left) would be read from the primary configuration information section 605. In contrast, the configuration engine computations associated with features c and z and the corresponding UI page (e.g., the UI page on the right) would not be read from the primary configuration information section 605.

As an alternative or an addition to storing configuration engine computations or UI page information, other relevant configuration information can also be stored. For example, in the event that a user provides a user input that causes a conflict, this conflict can be identified and stored in primary configuration information section 605 along with an explanation that can be displayed to the user. The explanation can be incorporated into a UI page, or in a form that a UI generation unit can use to present the explanation to the user. Alternatively, a user input can be initially stored in primary configuration information section 605 with a flag as opposed to the associated configuration engine computations, UI page or conflict information. The flag can be set to trigger a storing of the corresponding configuration information in primary configuration information section is 605 the next time that user input is provided by a user.

Alternatively, memory 601 can be comprised of a primary configuration information memory section only. Such an embodiment might be appropriate where every user input provided, and its associated configuration information, can be stored because, for example, ample memory resources are available, or only a small amount of product features are available. Thus, the present invention can be implemented with a memory or cache that is staged or not staged. Variations on the caching schema will be apparent to those skilled in the art in light of this detailed description and figures, and depend upon the particular application and product being configured.

FIGS. 3, 4, 5a, 5b and 5c provide further detail as to how the STFC, LTFC and primary configuration sections can be used and updated.

Figure 3:
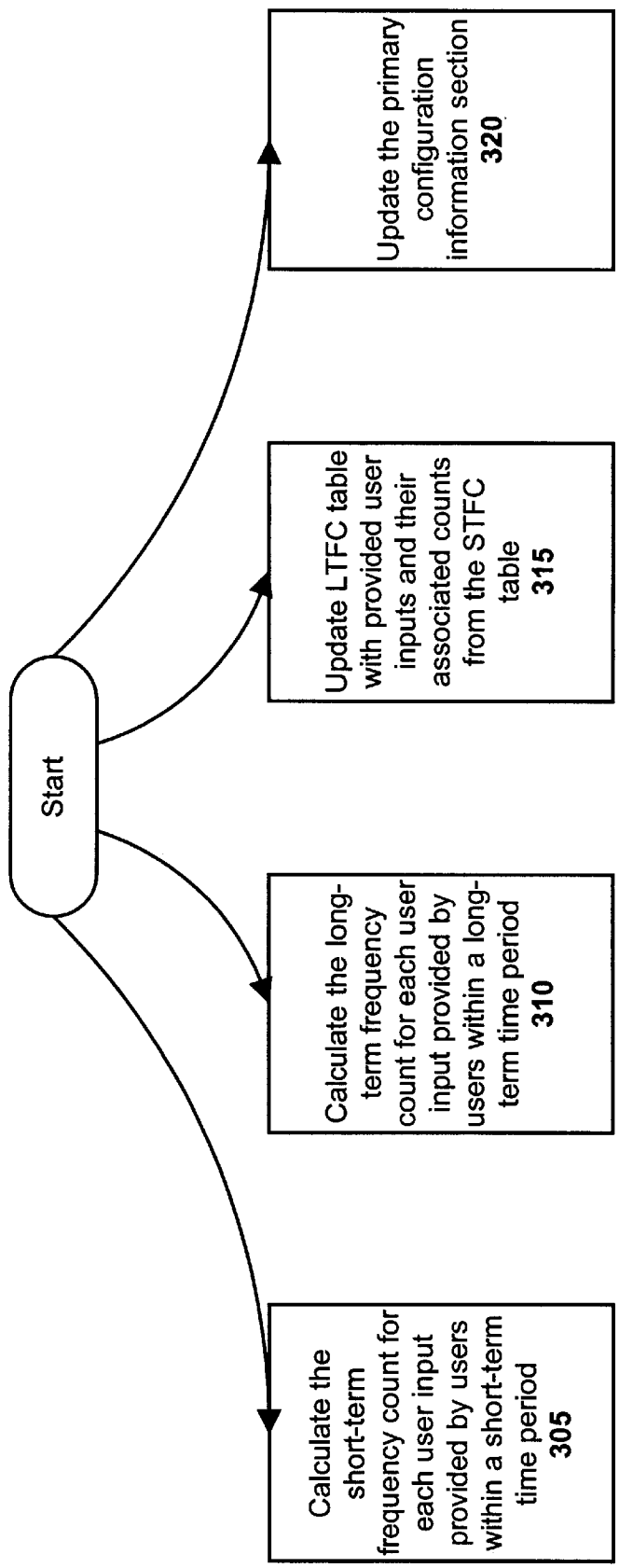
FIG. 3 illustrates a method for determining what configuration information to store in the cache in accordance with one embodiment of the present invention.

FIG. 3 illustrates a method for determining what configuration information to store in primary configuration information section 605 in accordance with one embodiment of the present invention. Process 301 includes calculating 305 a short-term frequency count for each user input provided by users within a short-term time period. This short-term frequency count can be maintained, for example, in STFC table 615 or its equivalent. This step of the process is further explained during the discussion of FIG. 4. Process 301 further includes calculating 310 a long-term frequency count for each input provided by users within a long-term period of time. This long-term frequency count can be maintained, for example, in LTFC table 610 or its equivalent. This step of the process is further explained during the discussion of FIG. 5a. Process 301 continues with updating 315 LTFC table 610 with selected user inputs and their associated counts from STFC table 615. This step of the process is further explained during the discussion of FIG. 5b. Process 301 also includes selectively updating 320 primary configuration information section 605 based on LTFC table 610 and STFC table 615 as will be explained in the discussion regarding FIG. 5c.

Figure 4:
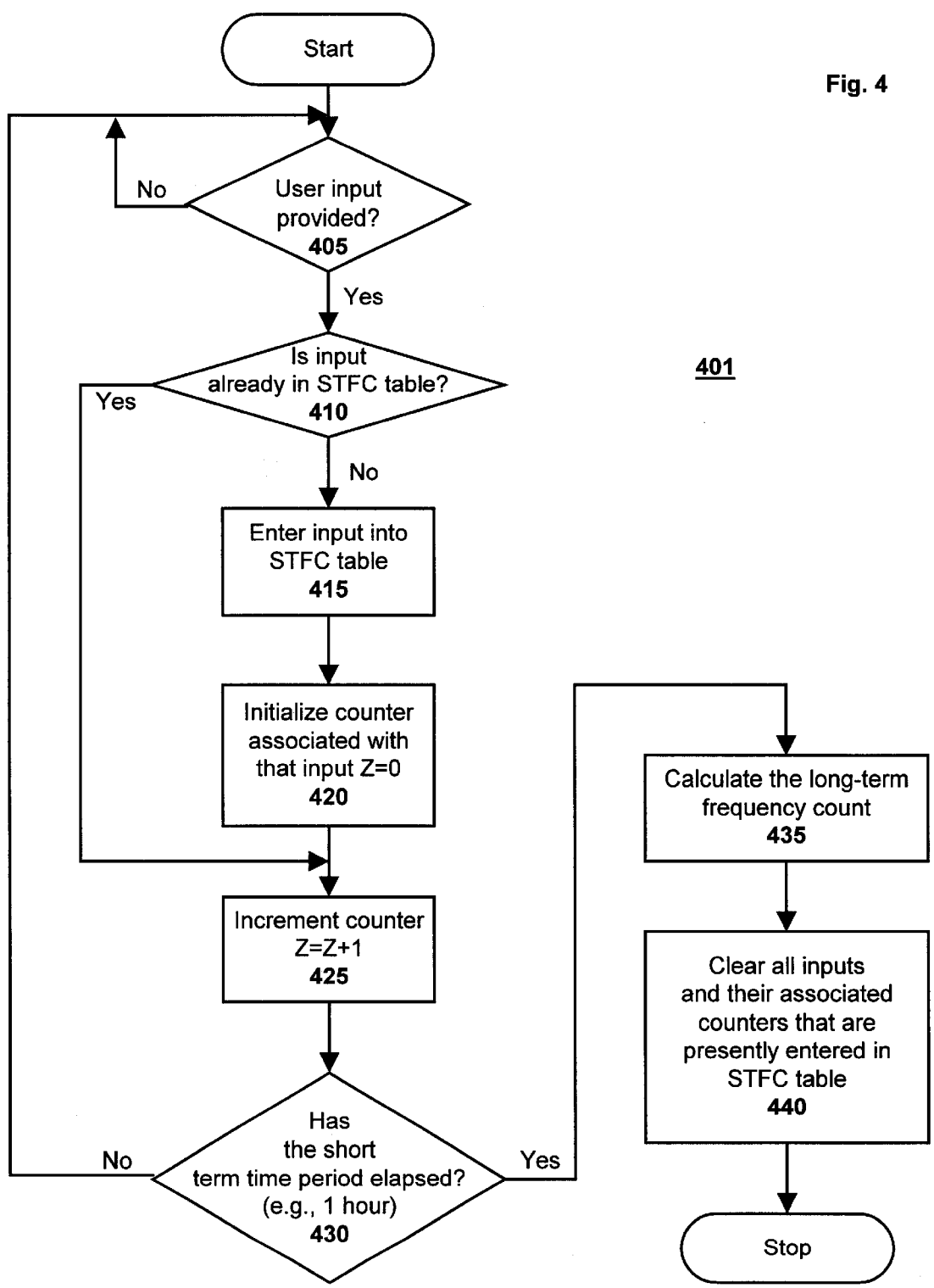
FIG. 4 illustrates a method for calculating a short-term frequency count in accordance with one embodiment of the present invention.

FIG. 4 illustrates a method for calculating a short-term frequency count in accordance with one embodiment of the present invention. The overall method is referred to as process 401. Process 401 can be implemented in a configuration system such as the ones illustrated in FIGS. 1a and 1b, although the process can also be implemented in other equivalent configuration environments. Processor 115 or its equivalent can be used to control process 401. For example, a conventional computer system can be used to implement processor 115. Regardless of the type of processor employed, it can be used to make determinations, receive input data, initialize and maintain counters, perform calculations, move, sort and shift data in memory, write and read from memory and to generally control process 401.

Process 401 includes an initial determination 405 as to whether a user input has been provided. If no input has been provided, process 401 continues to wait for one. Once it is determined that a user input has been provided, a further determination 410 is made as to whether that user input is already in STFC table 615. If the user input is not in STFC table 615, process 401 proceeds by entering 415 that user input into STFC table 615. Additionally, process 401 includes initializing 420 a counter associated with that user input to zero, and also storing that counter in STFC table 615. If the user input is in STFC table 615, steps 415 and 420 can be skipped. The process 401 continues by incrementing 425 the counter by one. Thus, a running tally of how many times the user input has been provided is maintained in STFC table 615.

Once the associated counter is incremented, a further determination 430 is made as to whether a short-term time period has elapsed. This short-term time period can be predefined (e.g., 1 hour) or can be defined dynamically. For example, if system traffic is heavier than expected, the short-term time period can be shortened or lengthened depending on the desired performance. If the short-term time period has not elapsed, then process 401 returns to step 405 and waits to receive a user input. If the short-term time period has elapsed, then process 401 includes calculating 435 the long-term frequency counts. Alternatively, step 435 can be performed independently of the short-term time period to achieve a greater level of control over the long-term frequency count calculation. Once the short-term time period has elapsed, process 401 continues by clearing 440 all the user inputs and their associated counters of STFC table 615 in preparation for the next short-term frequency count time period.

STFC table 615 can be implemented in a number of ways. For example, a block of memory coupled to LTFC table 610 and or primary configuration information section 605 can be reserved for STFC table 615 entries, or STFC table 615 can be maintained as a reserved part of a memory space comprised of STFC table 615, LTFC table 610 and primary configuration information section 605. The STFC table 615 can also be maintained on a server, RAM disk, data vault or other storage device that is accessible by LTFC table 610 and or primary configuration information section 605. Alternatively, STFC table 615 can be a data file stored in a storage device. STFC table 615 could also be implemented as a linked list of data structures where each user input and its associated count are included in a data structure. Other parameters associated with the user input (e.g., configuration engine computations or UI page information or an address pointer (e.g., identifying the location of a stored UI page) can also be stored in the data structure. One skilled in the art will recognize numerous ways to implement STFC table 615 in accordance with the present invention, and the above examples are not intended to limit the scope of the present invention.

Figure 5A:
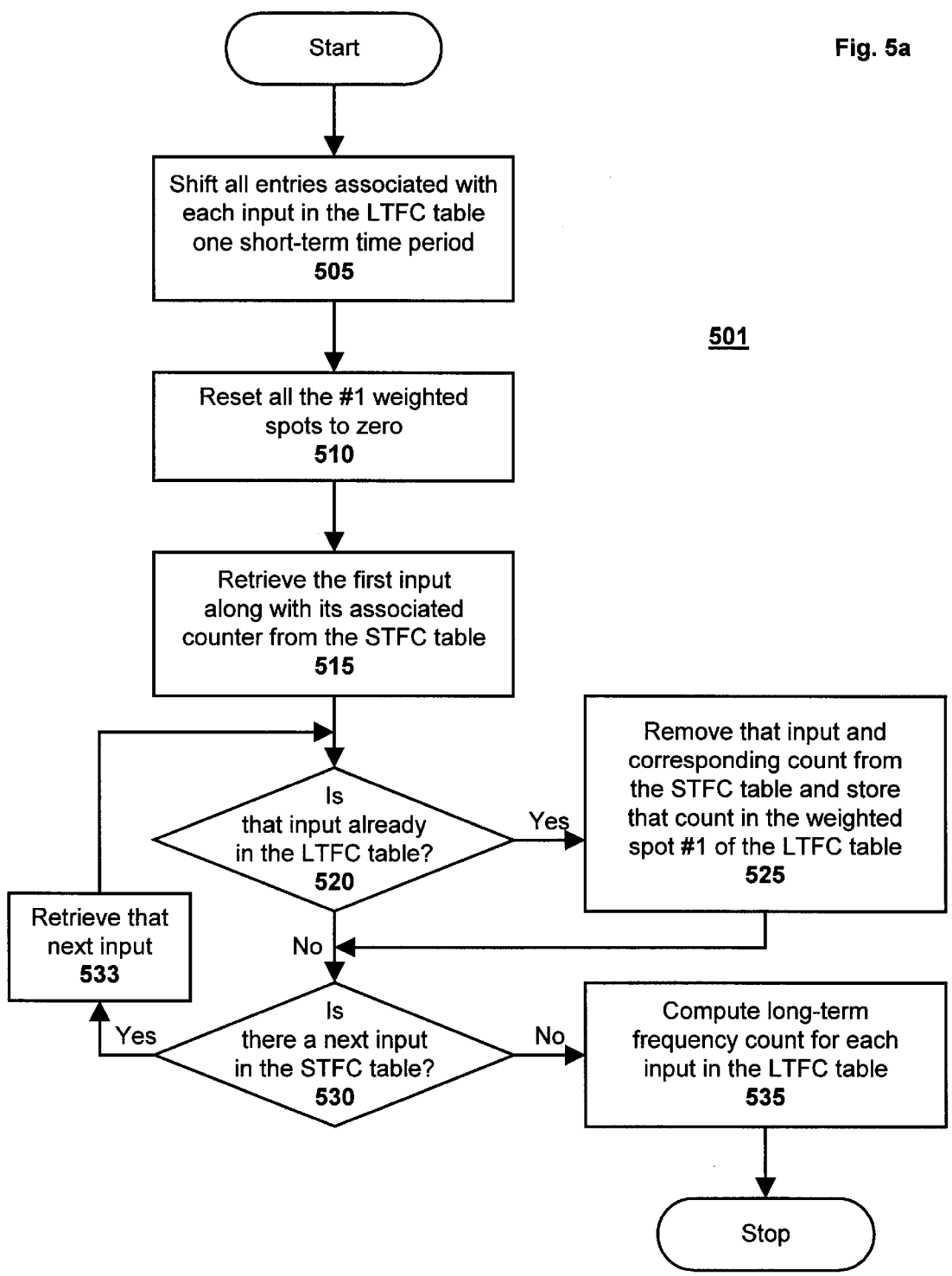
FIG. 5a illustrates a method for calculating a long-term frequency count for each of the user inputs in the LTFC table in accordance with one embodiment of the present invention.

FIG. 5a illustrates a method for calculating the long-term frequency count for each of the user inputs in the LTFC table in accordance with one embodiment of the present invention. The long-term frequency counts can be maintained, for example, in a LTFC table 610 or its equivalent. The above discussion as to how STFC table 615 can be implemented equally applies to the implementation of LTFC table 610. In one embodiment of the present invention, LTFC table 610 has more depth than STFC table 615. Specifically, STFC table 615 maintains a count for every user input provided by the users during a short-term time period. LTFC table 610, on the other hand, maintains a running tally of each short-term time period count for every user input stored in LTFC table 610. Each short-term time period count is assigned a weight and is referred to as an entry associated with the corresponding user input. Thus, any one user input in LTFC table 610 can be associated with any number of entries.

The overall method of calculating the long-term frequency count is referred to as process 501. Process 501 can be implemented in a configuration system such as the ones illustrated in FIGS. 1a and 1b, although the process can also be implemented in other equivalent configuration environments. Processor 115 or its equivalent can be used to control process 501. For example, an embedded microcontroller can be used as processor 115. Regardless of the processor type, it can be used to make determinations, receive input data, initialize and maintain counters, perform calculations, move, sort and shift data stored in memory, write and read from memory and to generally control process 501.

Process 501 includes shifting 505 all entries associated with each user input in LTFC table 610 by one short-term time period. For instance, with respect to the LTFC table 610 in FIG. 6, this would cause the count "39" for user input a1 to be moved from the "–1" position to the "–2" position, thereby indicating that user input a1 was provided 39 times two hours ago. Similarly, the count "45" would be moved from the "–2" position to the "–3" position, the count "22" would be moved from the "–3" position to the "–4" position, and so on. The count "30" would be deleted from the "–24" position.

This shifting has the effect of making the number one weighted position for each user input in LTFC table 610 available. Then, process 501 continues by resetting 510 all of the number one weighted positions to zero. The process 501 further includes retrieving 515 the first user input (along with its associated counter) of STFC table 615 for incorporation into the LTFC table 610. A determination 520 is made as to whether the user input is already in LTFC table 610. If the user input is in LTFC table 610, process 501 continues by removing 525 the user input and its associated count from STFC table 615, and storing the associated count in the number one weighted position of the corresponding user input of LTFC table 610. If the user input is not in LTFC table 610, step 525 is skipped.

An additional determination 530 is then made as to whether there is a next user input in STFC table 615 to be processed. If yes, then process 501 includes retrieving 533 that next user input and repeating steps 520 through 530 until determination 530 is answered in the negative. Once the last user input in STFC table 615 has been interrogated, process 501 proceeds by computing 535 the long-term frequency count for each user input in LTFC table 610. The long-term frequency count can be calculated in many different ways depending on the particular application. For example, the long-term frequency count for a user input can be calculated by summing all of the products resulting from multiplying the count and weight factor comprising each entry for that user input. Alternatively, the long-term frequency count for a user input can be calculated by summing all of the counts comprising the respective entries for that user input.

By using a weight factor in calculating the long-term frequency count, more significance can be given to certain time periods, or less significance as the case may be. For instance, counts corresponding to a busy time period (such as lunch time when more users are likely to access a configuration system) can be given more weight than counts from less busy time periods. In contrast, such counts can be given less weight than counts from less busy time periods if so desired. Alternatively, older counts (e.g., counts from 20 hours ago) can be given less weight than newer counts (e.g., counts from the last hour). For example, if 95% of the long-term frequency count has occurred in the last two short-term time periods, the weight attributed to those time periods could be increased or decreased depending on the desired system performance. Those skilled in the art will appreciated many ways in which to use a weight factor in calculating the long-term frequency count in accordance with the present invention, and the examples mentioned here are not intended to limit the present invention.

Figure 5B:
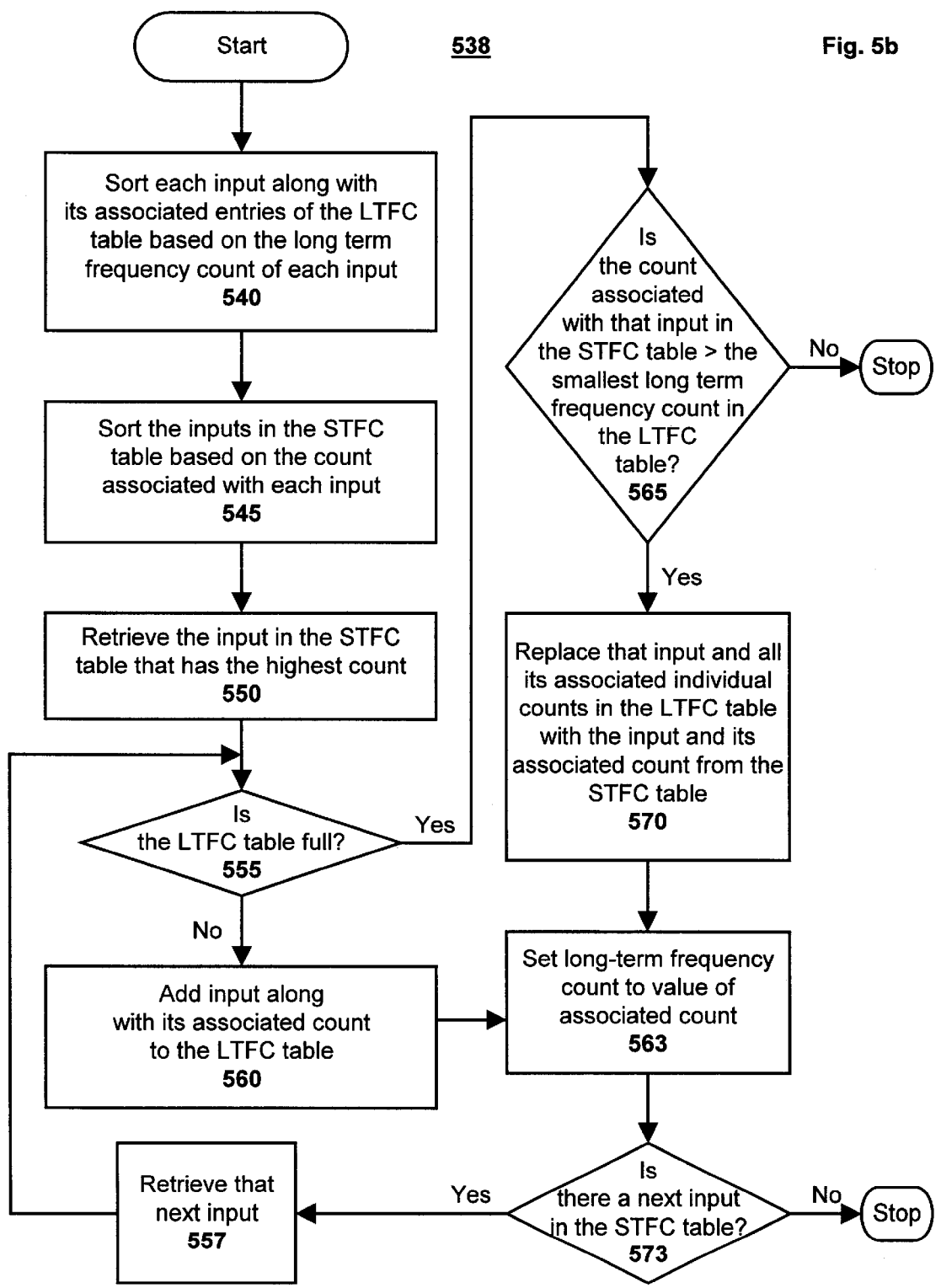
FIG. 5b illustrates a method for updating a long-term frequency count table in accordance with one embodiment of the present invention.

FIG. 5b illustrates a method for updating a long-term frequency count table in accordance with one embodiment of the present invention. The overall method is referred to as process 538. Process 538 can be implemented, for example, in a configuration system such as the ones illustrated in FIGS. 1a and 1b, although the process can also be implemented in other equivalent configuration environments. Processor 115 or its equivalent can be used to control process 538. For example, a CPU coupled to a memory can be used as processor 115. Regardless of the processor type, it can be used to make determinations, receive input data, initialize and maintain counters, perform calculations, move and shift data stored in memory, sort data points, write and read from memory and to generally control process 538.

Exemplar process 538 includes sorting 540 each user input along with its associated entries (weighted counts) of LTFC table 610 based on the long-term frequency count of each user input. Additionally, process 538 includes sorting 545 each user input of STFC table 615 based on the count associated with each user input. The tables can be in either ascending or descending order with respect to counts by which they are sorted. After both tables are sorted, process 538 continues by retrieving 550 the user input from STFC table 615 that has the highest count. Then, a determination 555 is made as to whether LTFC table 610 is full. If not, process 538 further includes adding 560 that user input along with its associated count to LTFC table 610.

However, if determination 555 is affirmative because LTFC table 610 is full, a further determination 565 is made as to whether the count associated with that user input in STFC table 615 is greater than the smallest long-term frequency count in LTFC table 610. If no, process 538 is complete. This is so because once one user input from the sorted STFC table 615 is determined to have a count less than or equal to the smallest long-term frequency count, then the remaining user inputs of the sorted STFC table 615 will also have counts less than or equal to that smallest long-term frequency count. If, on the other hand, the count associated with that user input in STFC table 615 is greater than the smallest long-term frequency count in LTFC table 610, the process 538 continues by removing that user input and its associated count from STFC table 615, and replacing 570 the user input in LTFC table 610 (along with all of its entries) having the smallest long-term frequency count.

Once step 560 or 570 has been performed, then process 538 proceeds by setting 563 a long-term frequency count to the value of the count associated with the user input that was added to the LTFC table (whether the user input and associated count were added by step 560 or by 570). A determination 573 as to whether there is a next user input in the STFC table is then made. If there is a next user input, then process 538 includes retrieving 557 that user input and repeating steps 555 through 570 as necessary until the determination 573 is negative. Process 538 stops once determination 573 is negative.

Those skilled in the art will recognize other ways of updating LTFC table 610 with user inputs from STFC table 615 in accordance with the present invention. For example, the determination 565 could be based on weight factors (as opposed to counts) associated with the user inputs of the LTFC and STFC tables. The above description is offered as an example and is not intended to limit, the present invention. Other comparative methods known in the art, whether mathematical, statistical, graphical or the like, are also intended to be covered by the present invention.

Figure 5C:
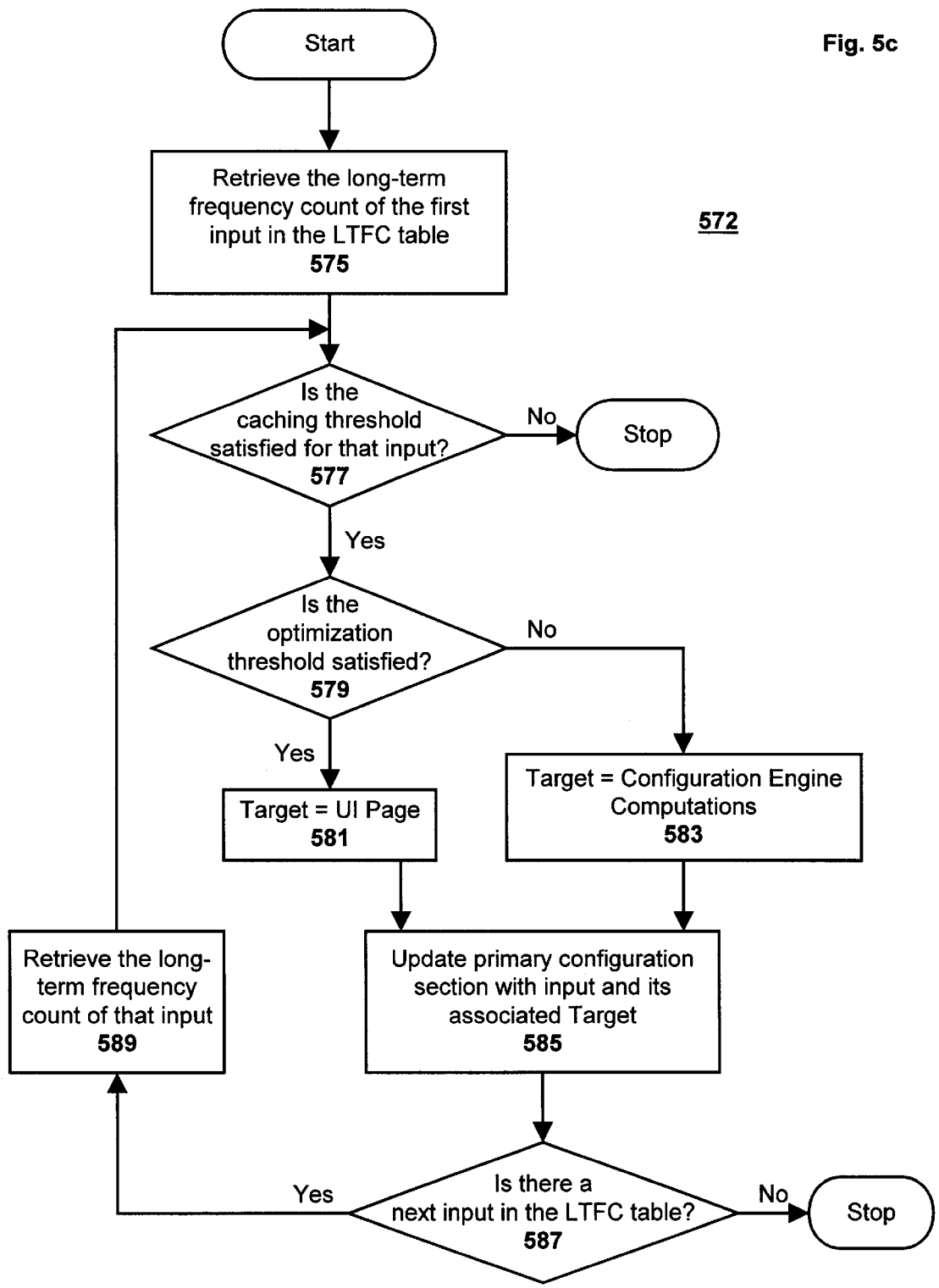
FIG. 5c illustrates a method for updating a primary configuration information section in accordance with one embodiment of the present invention.

FIG. 5c illustrates a method for updating the primary configuration information section in accordance with one embodiment of the present invention. The overall method is referred to as process 572. Process 572 can be implemented, for example, in a configuration system such as the ones illustrated in FIGS. 1a and 1b, although the process can also be implemented in other equivalent configuration environments. Processor 115 or its equivalent can be used to control process 572. For example, a embedded microcontroller can be used as processor 115. Regardless of the processor type, it can be used to make determinations, receive input data, initialize and maintain counters, perform calculations, move and shift data stored in memory, sort data points, write and read from memory and to generally control process 572.

Process 572 includes retrieving 575 the long-term frequency count associated with the first user input in the LTFC table. Alternatively, step 575 may include sorting (prior to retrieving the long-term frequency count) the LTFC table by the long-term frequency counts of each user input in the table. Such sorting may be desirable, for example, to stop process 572 once the long-term frequency count drops below a certain level. Sorting ensures that once a deficient long-term count is identified, the remaining counts will also be deficient. As such, process 572 can be stopped once the long-term frequency count drops below a certain level. If the LTFC table is not sorted, on the other hand, then each long-term frequency count in the table is interrogated. Thus, for some applications where system efficiency is important, the LTFC table can be sorted prior to retrieving the long-term frequency count associated with the first user input in the LTFC table.

Once a long-term frequency count is retrieved 575, a determination 577 can be made as to whether a caching threshold has been met. In one embodiment, the caching threshold can be a minimum number that the long term-frequency count associated with an user input has to be in order for that user input and its associated configuration information to be stored in primary configuration information section 605. In such a case, if the caching threshold is not satisfied, the user input associated with the deficient count is not stored in primary configuration information section 605. If, however, the caching threshold is satisfied, a further determination 579 can be made as to whether an optimization threshold associated is satisfied.

This optimization threshold can be set to optimize the response time of the configuration system. For example, it might take 500 microseconds for UI generation unit 110 to generate the corresponding UI page, while it might take only 100 microseconds to retrieve that UI page from memory (e.g., primary configuration information section 605, LTFC table 610 or STFC table 615). Thus, it may be more efficient (with respect to system response time) to cache the UI page associated with a heavily selected user input rather than just the configuration engine computations associated with that user input. Likewise, the optimization threshold can be set to optimize the use of cache 120 of the configuration system. Such optimization may be desirable because, in general, configuration engine computations take up less storage space than a UI page takes up. For example, the optimization threshold can be set to a lower value (i.e., less difficult to satisfy) if the cache 120 has ample space available to store UI pages or portions of UI pages. In contrast, the optimization threshold can be set to a higher value (i.e., more difficult to satisfy) if the cache 120 has limited space available. Proper setting of the optimization threshold, therefore, can optimize the configuration system response time given a limited amount of available storage space in cache 120.

In one embodiment, the optimization threshold defines a minimum number that the long-term frequency count associated with a user input has to be in order for an associated UI page (or portion thereof) to be stored in primary configuration information section 605. Otherwise, just the configuration engine computations associated with that user input are stored in primary configuration information section 605. Note that it is possible to satisfy the caching threshold of step 577, but not satisfy the optimization threshold of step 579. For example, the caching threshold can be set to 50, while the optimization threshold can be set to 75. Assume that for this example, the long-term frequency count associated with a user input is used to determine if both thresholds are satisfied. Thus, a user input in the LTFC table having a long-term frequency count of 65 would satisfy the caching threshold, and therefore would be eligible for storing in the primary configuration information section 605. However, only the configuration engine computations associated with that user input would be eligible for storing, and not the UI page associated with that user input. If determination 579 indicates that the optimization threshold has been satisfied, then process 572 includes targeting 581 the UI page associated with that user input for storing in primary configuration information section 605. On the other hand, if determination 579 indicates that the optimization threshold has not been satisfied by a user input, then process 572 includes targeting 583 the configuration engine computations associated with that user input for storing in primary configuration information section 605.

Once a user input and its associated UI page or configuration engine computations are targeted for caching, then process 572 further includes updating 585 the primary configuration information section 605. In one embodiment of the present invention, the configuration engine computations associated with the user input are generated prior to storing that user input in primary configuration information section 605. Likewise, the configuration engine computations can then be provided to a UI generation unit thereby generating a UI page associated with the user input prior to storing that user input in primary configuration information section 605. This way, the user input and its associated target, whether it be configuration engine computations or a UI page (partial or complete), can be stored together in primary configuration information section 605. This pre-computing approach may be desirable in some applications where an immediate response is necessary.

Alternatively, rather than pre-compute the configuration engine computations or the UI page associated with a user input, that user input can be stored in primary configuration information section 605 on its own. In such a case, a flag can be set in primary configuration information section 605 indicating that next time that user input is provided by a user, the configuration engine computations or the UI page associated with the user input can be generated and stored in primary configuration information section 605. This particular scenario may be desirable when primary configuration information section 605 is full. Rather than remove a less significant input from primary configuration information section 605 to make room for a new and more significant user input, that less significant input is maintained until the next time the more significant user input is selected. Thus, if the less significant user input is selected sometime between the two times the new user input is selected, the necessary configuration information associated with that less significant user input will still be available in primary configuration information section 605.

Alternatively, the configuration engine computations or UI page information associated with the user input can be temporarily stored in a second memory. For example, a cache target associated with the user input can be stored in STFC table 615. This embodiment may be desirable if the requisite memory is available, and waiting for the user input to be selected a second time is unacceptable. Thus, there are many schemes that can be implemented in the process of updating a cache or memory in accordance with the present invention. These above described embodiments are offered as examples and are not intended to limit the scope of the present invention.

Once primary configuration information section 605 is updated in step 585, a determination 587 is made as to whether there is a next user input in LTFC table 610. If yes, then process 572 further includes retrieving 589 the long-term frequency count associated with that next user input from LTFC table 610 and steps of 577 through 587 can be repeated until determination 587 is negative. Once determination 587 is negative, process 572 is stopped.

The foregoing description of the embodiments of the invention has been presented for the purposes of illustration and description. It is not intended to be exhaustive or to limit the invention to the precise form disclosed. Many modifications and variations are possible in light of the above teaching as will be understood by those skilled in the art. It is intended that the scope of the invention be limited not by this detailed description, but rather by the claims appended hereto.

What is claimed is:

1. A method for configuring a configurable product wherein the method operates in a system having a configuration engine and a user interface coupled to a user interface generation unit, the method comprising:

receiving a user input from the user interface;
  determining if the user input has been previously provided;

responsive to the user input having been previously provided, retrieving user interface page information that is responsive to the user input from a memory that is coupled by a processor to the configuration engine, the user interface generation unit, and the user interface;

responsive to the user input not having been previously provided, accessing the configuration engine and storing the user input in a short-term frequency count section of the memory; and maintaining and storing a first count in the short-term frequency count section of the memory, wherein that first count corresponds to the number of times the user input has been provided over a first time period.

2. The method of claim 1 further comprising:

responsive to the user input not having been previously provided, storing the user input in a long-term frequency count section of the memory; and maintaining and storing a second count in the long-term frequency count section of the memory, wherein that second count corresponds to the number of times the user input has been provided over a second time period.

3. A method for configuring a configurable product wherein the method operates in a system having a configuration engine and a user interface coupled to a user interface generation unit, the method comprising:

receiving a user input from the user interface;

determining if the user input has been previously provided;

responsive to the user input having been previously provided, retrieving user interface page information that is responsive to the user input from a memory that is coupled by a processor to the configuration engine, the user interface generation unit, and the user interface;

responsive to the user input not having been previously provided, accessing the configuration engine and storing the user input in the memory;

determining if a caching threshold that is fixed has been satisfied for the user input;

responsive to the caching threshold being satisfied, storing the user input in a primary configuration information section of the memory; and storing a flag responsive to the user input in the primary configuration information section of the memory.

4. The method of claim 3, wherein responsive to the caching threshold being satisfied, the storing of the user input that is responsive to the caching threshold being satisfied includes:

responsive to the caching threshold being satisfied determining if an efficiency threshold has been satisfied; and responsive to the efficiency threshold being satisfied performing the storing of the user input.

5. A method for configuring a configurable product wherein the method operates in a system having a configuration engine and a user interface coupled to a user interface generation unit, the method comprising:

receiving a user input from the user interface;

determining if the user input has been previously provided;

responsive to the user input having been previously provided, retrieving user interface page information that is responsive to the user input from a memory that is coupled by a processor to the configuration engine, the user interface generation unit, and the user interface;

responsive to the user input not having been previously provided, accessing the configuration engine and storing the user input in the memory;

determining if a caching threshold has been satisfied for the user input by determining a frequency at which the user input was previously provided;

responsive to the caching threshold being satisfied, determining a cache target; and setting and storing at least a flag in a primary configuration information section of the memory that indicates the cache target is to be stored the next time the user input is provided.

6. A system for configuring a configurable product, the system having a configuration engine and a user interface coupled to a user interface generation unit, wherein the system further comprises:

a processor that is coupled to each of the user interface, the user interface generation unit and the configuration engine, the processor for receiving a user input from the user interface and for determining if the user input has been previously provided; and a memory coupled to the processor for storing a number of configuration engine computations and user interface page information responsive to the user input, wherein the memory comprises a short-term frequency count section for storing the user input, and for storing a first count associated with the user input that corresponds to the number of times that user input is provided over a first time period.

7. The system of claim 6 wherein the memory comprises:

a long-term frequency count section for storing the user input, and for storing a second count associated with the user input that corresponds to the number of times that user input has been provided over a second time period.

8. A system for configuring a configurable product, the system having a configuration engine and a user interface coupled to a user interface generation unit, wherein the system further comprises:

a processor that is coupled to each of the user interface, the user interface generation unit and the configuration engine, the processor for receiving a user input from the user interface and for determining if the user input has been previously provided; and a memory coupled to the processor for storing a number of configuration engine computations and user interface page information responsive to the user input, wherein the memory comprises a primary configuration information section for storing the user input in response to a caching threshold being satisfied for that user input, and for storing at least the number of configuration engine computations responsive to the user input and a conflict explanation responsive to the user input.

9. A method for configuring a configurable product, the method comprising:

counting how many times a selected feature is selected over a fixed period of time;

receiving data generated by a configuration engine in response to the selected feature of the configurable product being selected a first time;

storing the data in a memory;

storing the selected feature of the configurable product in a short-term frequency count section of the memory;

maintaining and storing a first count in the short-term frequency count section that corresponds to the number of times the selected feature of the configurable product has been provided over a first time period; and responsive to the selected feature of the configurable product being selected a second time, retrieving the data from the memory.

10. The method of claim 9 wherein storing the data in a memory further comprises:

storing the selected feature of the configurable product in a long-term frequency count section of the memory; and maintaining and storing a second count in the long-term frequency count section of the memory that corresponds to the number of times the selected feature of the configurable product has been provided over a second time period.

11. A method for configuring a configurable product, the method comprising:

counting how many times a selected feature is selected over a fixed period of time;

receiving data generated by a configuration engine in response to the selected feature of the configurable product being selected a first time;

storing the data in a memory;

responsive to the selected feature of the configurable product being selected a second time, retrieving the data from the memory;

determining if a caching threshold has been satisfied for the selected feature of the configurable product;

responsive to the caching threshold being satisfied, storing the selected feature of the configurable product in a primary configuration information section of the memory; and storing user interface page information responsive to that selected feature in the primary configuration information section of the memory if a first criterion is met, storing a number of configuration engine computations responsive to that selected feature in the primary configuration information section of the memory if a second criterion is met, storing a conflict explanation responsive to that selected feature in the primary configuration information section of the memory if a third criterion is met, and storing a flag responsive to that selected feature in the primary configuration information section of the memory if a fourth criterion is met.

12. A method for configuring a configurable product, the method comprising:

counting how many times a selected feature is selected over a fixed period of time;

receiving data generated by a configuration engine in response to the selected feature of the configurable product being selected a first time;

storing the data in a memory;

responsive to the selected feature of the configurable product being selected a second time, retrieving the data from the memory;

determining if a caching threshold has been satisfied for the selected feature of the configurable product;

responsive to the caching threshold being satisfied, determining a cache target; and setting and storing a flag in a primary configuration information section of the memory that indicates the cache target is to be stored the next time the feature is selected if a first criterion is met, and retrieving the cache target from a second memory and storing it in the primary configuration information section of the memory if a second criterion is met.

13. The method of claim 12, wherein the cache target is capable of being a user interface page information that is responsive to the selected feature of the configurable product, and is capable of being a number of configuration engine computations that are responsive to the selected feature of the configurable product.

14. A method for configuring a configurable product wherein the method operates in a system having a configuration engine and a user interface coupled to a user interface generation unit, the method comprising:

receiving a user input from the user interface;

determining if the user input has been previously provided;

responsive to the user input having been previously provided, retrieving user interface page information that is responsive to the user input from a memory that is coupled by a processor to the configuration engine, the user interface generation unit, and the user interface;

responsive to the user input not having been previously provided, accessing the configuration engine and storing the user input in the memory;

determining if a caching threshold has been satisfied for another user input;

responsive to the caching threshold being satisfied, determining a cache target; and retrieving the cache target from a second memory, and storing it in the primary configuration information section of the memory.

15. A method for configuring a configurable product wherein the method operates in a system having a configuration engine and a user interface coupled to a user interface generation unit, the method comprising:

receiving a user input from the user interface;

determining if the user input has been previously provided;

responsive to the user input having been previously provided, retrieving user interface page information that is responsive to the user input from a memory that is coupled by a processor to the configuration engine, the user interface generation unit, and the user interface;

responsive to the user input not having been previously provided, accessing the configuration engine and storing the user input in the memory;

determining if a caching threshold has been satisfied for the user input;

responsive to the caching threshold being satisfied, storing the user input in a primary configuration information section of the memory; and storing a conflict explanation responsive to the user input in the primary configuration information section of the memory.

16. A system for configuring a configurable product, the system having a configuration engine and a user interface coupled to a user interface generation unit, wherein the system further comprises:

a processor that is coupled to each of the user interface, the user interface generation unit and the configuration engine, the processor for receiving a user input from the user interface and for determining if the user input has been previously provided; and a memory coupled to the processor for storing a number of configuration engine computations and user interface page information responsive to the user input, wherein the memory comprises a primary configuration information section for storing the user input in response to a caching threshold being satisfied for that user input, and for storing at least the number of configuration engine computations responsive to the user input and a flag responsive to the user input.

* * * * *